United States Patent [19]

Kearns

[11] 4,268,878
[45] May 19, 1981

[54] GAS CIRCULATION AND FILTRATION APPARATUS FOR MAGNETIC DISC RECORDING SYSTEMS

[75] Inventor: William J. Kearns, Costa Mesa, Calif.

[73] Assignee: New World Computer Company, Inc., Costa Mesa, Calif.

[21] Appl. No.: 44,533

[22] Filed: Jun. 1, 1979

[51] Int. Cl.³ .................. G11B 23/02; G11B 25/04; G11B 5/82
[52] U.S. Cl. ........................... 360/97; 360/133
[58] Field of Search .............. 360/97, 99, 135, 133, 360/137, 86; 206/444; 346/137

[56] References Cited

U.S. PATENT DOCUMENTS

| | | | |
|---|---|---|---|
| 3,191,179 | 6/1965 | Pelech et al. | 360/99 |
| 3,573,771 | 4/1971 | Cockrell, Jr. | 360/99 |
| 3,740,735 | 6/1973 | Gabor | 360/97 |
| 3,825,951 | 7/1974 | Katsumori et al. | 360/98 |
| 3,863,266 | 1/1975 | Hoshino | 360/86 |
| 3,912,278 | 10/1975 | Teutsch | 360/97 |
| 4,002,826 | 1/1977 | Iemenschot | 360/99 |
| 4,130,845 | 12/1978 | Kulma | 360/133 |

OTHER PUBLICATIONS

IBM Tech. Disc. Bull., R. J. Charlton, Disk Pack Air Pump, vol. 11, No. 8, Jan. 1969, p. 951.

Primary Examiner—Alfred H. Eddleman
Attorney, Agent, or Firm—Lyon & Lyon

[57] ABSTRACT

Apparatus is disclosed for circulating and filtering gas within a magnetic disc recording system. The apparatus includes a base plate which supports a rotating disc and a cover which comprises a control plate adapted to be positioned adjacent to and parallel to the rotating disc. A central opening is formed into the control plate, and a first gas chamber is placed in communication with the central opening through a filter chamber including a filter element. The cover and base plate cooperate to define a second gas chamber in communication with the outer edge of the rotating disc and the control plate. Openings are formed into the filter chamber for allowing gas flow from the second gas chamber through the filter element into the first gas chamber. The gas is circulated and filtered to remove particles suspended in the gas that might damage the gas bearing surfaces of magnetic transducers or the surface of the rotating disc.

15 Claims, 3 Drawing Figures

GAS CIRCULATION AND FILTRATION APPARATUS FOR MAGNETIC DISC RECORDING SYSTEMS

This invention relates generally to gas pumping and filtering devices and more particularly to an apparatus for circulating and filtering gas within a magnetic disc recording system.

Reference is made to the following co-pending applications concurrently filed with this application: Ser. No. 44,535, filed June 1, 1979 and entitled "Actuator Apparatus for Magnetic Disc Recording Systems"; Ser. No. 44,534, filed June 1, 1979 and entitled "Isolated Multiple Core Magnetic Transducer Assembly"; and Ser. No. 44,536, filed June 1, 1979 and entitled "Suspension Device for Magnetic Transducers". The above-referenced applications are assigned to the same assignee as this application and disclose and claim subject matter related to the present application.

Magnetic disc recording systems in use today generally employ magnetic transducers that are suspended upon a gas bearing near the surface of a rotating magnetic disc. This gas bearing is typically in the order of fifteen to twenty micro-inches thick. Ordinary dust and smoke particles, for example, are larger than the gas bearing thickness and, if allowed to freely circulate through the gas bearing, may cause damage or wear to the magnetic transducers or the disc surface.

To prevent such damage, however, various filtration systems are employed in magnetic disc recording systems to remove particles from the gas that surrounds the disc. One such system is disclosed in U.S. Pat. No. 3,846,835 wherein a powered circulation blower forces gas contained within a magnetic disc recording system through a filter means and then exhausts this filtered gas adjacent to the surfaces of a plurality of rotating discs. This system, however, requires additional power to operate the circulation pump thus decreasing overall efficiency. Other systems, such as those disclosed in U.S. Pat. Nos. 3,071,312 and 4,069,503 employ rotating discs or suspended discs to provide for gas pumping. However, these devices provide no filtration while additionally increasing the energy required to rotate the associated disc. Additional similar systems are disclosed in U.S. Pat. Nos. 2,104,246; 2,655,310; 3,153,241; 3,260,039; 3,688,285; and 3,900,893.

The apparatus of the present invention provides a gas circulation and filtration system that not only requires no additional external power, but effectively decreases the drag of the rotating disc, thus decreasing the overall energy required to operate the magnetic disc recording system. According to a preferred embodiment of the present invention, a control plate is adapted to be positioned near a rotating disc within a closed magnetic disc drive system cabinet or enclosure. The control plate has formed into it a central opening through which gas is drawn when the control plate is positioned near the surface of the rotating disc. A filter is in communication with this opening and filters gas as it is drawn first through the filter and subsequently through the central opening. Additionally, the reaction between the control plate and the rotating disc decreases the drag upon the rotating disc, resulting in an apparatus that provides gas filtration without expending additional energy to pump the gas throughout the system, while also decreasing the energy required to rotate the disc.

It is thus an object of the present invention to provide a gas circulation and filtration apparatus for a magnetic disc recording system.

It is another object of the present invention to provide a gas circulation and filtration apparatus for a magnetic disc recording system that operates efficiently.

It is a further object of the present invention to provide a gas circulation and filtration apparatus for a magnetic disc recording system that decreases the drag on the rotating disc.

These and other objects and advantages of the present invention will be apparent from the following detailed description.

Figure 1:
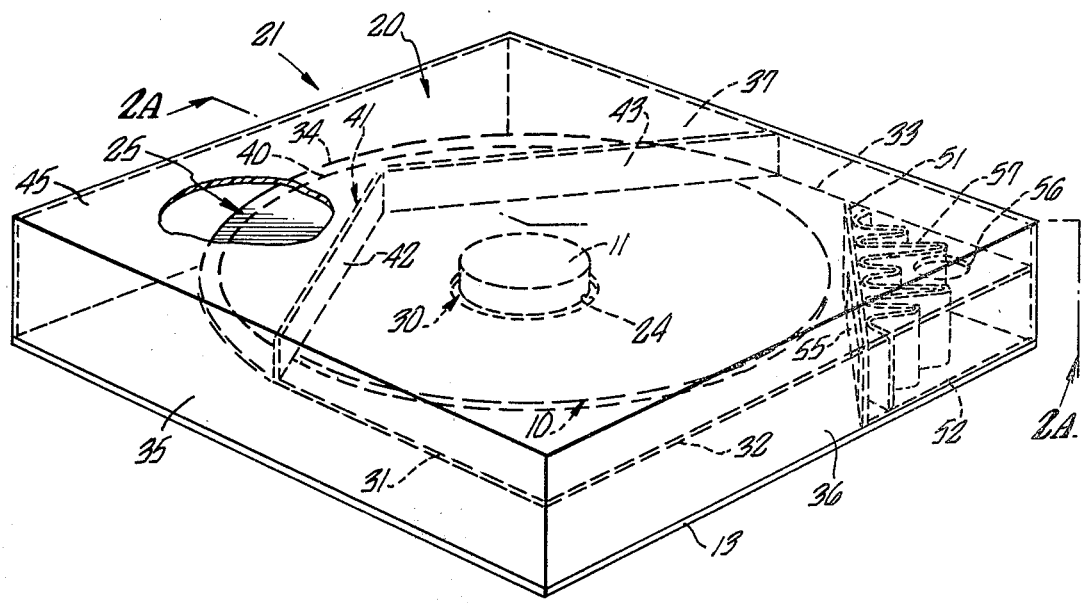
FIG. 1 is a perspective view of the apparatus of the present invention.
Figure 2A:
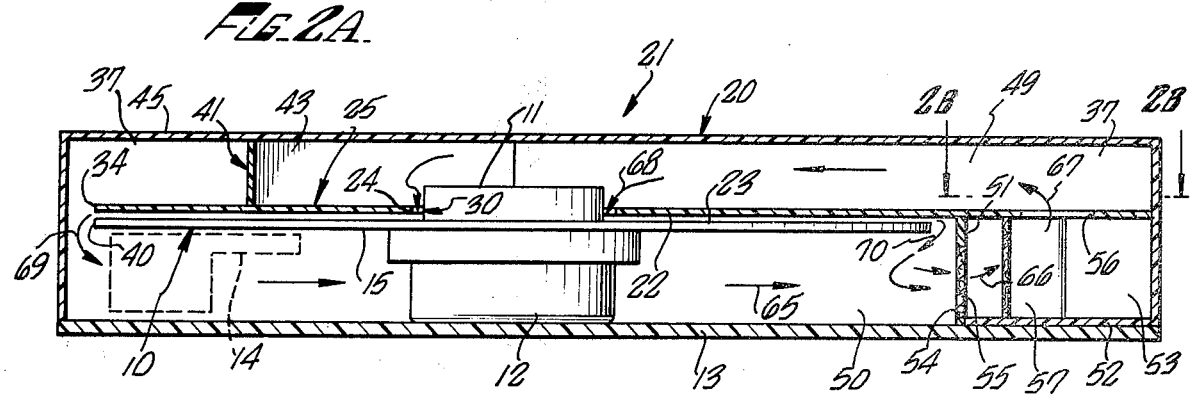
FIG. 2A is a cross-section side view of the apparatus of the present invention taken substantially through lines 2—2 of FIG. 1.
Figure 2B:
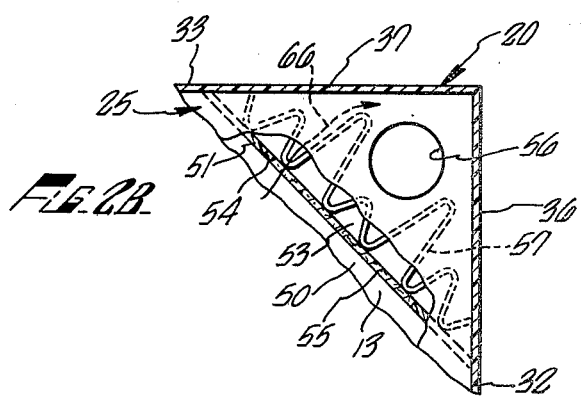
FIG. 2B is a framentary view of the filtration chamber of FIG. 2A.

Referring now to a detailed description of the drawings, a rigid disc 10 is fastened at its center by hub 11 to a drive apparatus such as the shaft of motor 12. The motor 12 is fixed near the center of a base plate 13 of the magnetic disc drive system, which forms the mounting plate for the remaining disc drive components generally illustrated at 14, such as magnetic transducers, suspension means for the magnetic transducers and an actuator apparatus required to position the magnetic transducers heads near the rotating disc. In a preferred embodiment, the remaining disc drive components 14 are positioned adjacent a lower surface 15 of the disc 10.

A cover 20 is adapted to be positioned over the base plate 13 to completely enclose and seal the magnetic disc drive system generally designated 21, creating a generally square box of low profile. A control plate 25 is fixed within the cover 20 and, when the cover 20 is positioned over the base plate 13, a control surface 22 of the control plate 25 is parallel to the disc upper surface 23 and is spaced therefrom a distance in the range of 0.020 inch to 0.060 inch. A central opening 24 is formed through control plate 25 and is adapted to concentrically receive hub 11. The central opening 24 and the hub 11 define an annular opening 30 when the cover 20 is positioned over the base plate 13.

Three edges 31, 32 and 33 of the control plate 25 are fixed to the inside surface of cover sidewalls 35, 36 and 37, respectively. A fourth edge 34, formed into a semicircle between the edges 31 and 33, is adapted to be adjacent to the disc edge 40 when the cover 20 is in place upon the base plate 13. A baffle 41 includes a first member 42 that extends horizontally from a sidewall 35 at a point where the edges 31 and 34 intersect to a point generally intermediate the outermost extension of edge 34 and hub 11. A second member 43 of the baffle 41 extends horizontally from the sidewall 37 at a point where the edges 33 and 34 intersect to join with the first member 42 at a point intermediate the outermost extension of the edge 34 and hub 11. The first and second members 42 and 43 extend vertically between control plate upper surface 44 and the inside surface of a cover top member 45. The baffle 41, cover top member 45, control plate upper surface 44, and sidewalls 35 through 37 cooperate to define a first gas chamber 49 generally between the cover top member 45 and the control plate upper surface 44. With the cover 20 positioned over the base plate 13, the control surface 22, cover 20, and base plate 13 cooperate to form second gas chamber 50.

A filter baffle 51 is fixed against the control surface 22 and sidewalls 36 and 37 to define a generally triangular volume at one corner of the cover 20. A filter seal plate 52 is fixed at the lower edges of the sidewalls 36 and 37 and the filter baffle 51 so that the seal plate 52 is adjacent the base plate 13 when the cover 20 is positioned over the base plate 13. The control plate 25, sidewalls 36 and 37, filter baffle 51, and filter seal plate 52 cooperate to define a filter chamber 53. An opening 54 is formed into the filter baffle 51 to provide a gas flow path between the the second gas chamber 50 and the filter chamber 53. Disposed within the opening 54 is a filter element 55. A second opening 56 is formed into the control plate 25 to provide a gas flow path between the filter chamber 53 and the first gas chamber 49. Additional filter material 57 is disposed within the filter chamber 53. The edges of the additional filter material 57 are fixed to the control surface 22, the inside surface of the filter seal plate 52, and the sidewalls 36 and 37 to form a gas seal between first gas chamber 49 and second gas chamber 50.

When the motor 12 is energized to rotate the hub 11 and disc 10, the reaction between the control surface 22 and disc upper surface 23 draws gas from the second gas chamber 50 through the filter element 55, filter material 57, opening 56, first gas chamber 49 and annular opening 30, as shown generally by flow arrows 65–68, and forces the gas from between the control surface 22 and the disc upper surface 23 through an area defined by the disc edge 40 and control surface 22, shown by flow arrows 69 and 70. This circulation and filtration of gas continues while disc 10 rotates. The reaction between control surface 22 and disc upper surface 23 also unexpectedly decreases the torque required by the motor 12 to rotate the disc 10 at a given speed. This is apparently a result of the control surface 22 forcing the turbulent flow normally associated with the surface 23 of the rotating disc 10 to become a generally laminar flow, thereby decreasing the drag normally associated with disc upper surface 23.

Having thus described one embodiment of my invention in detail, it is to be understood that numerous equivalents and alternatives which do not depart from the invention will be apparent to those skilled in the art, given the teachings herein. Thus, my invention is not to be limited to the above description but is to be of the full scope of the appended claims.

I claim:

1. A gas circulation and filtration apparatus for use with a magnetic disc recording system, said system including a rotating disc having a first side and an outer edge, comprising:
    a control surface adapted to be disposed parallel to said first side and spaced therefrom a substantially small distance to cause gas flow therebetween to be substantially laminar, said control surface having an opening formed therein adapted to be concentric with the center of said rotating disc, said control surface and said opening formed therein, said first side, and said outer edge defining an annular region;
    a first gas chamber in communication with said annular region at said control surface opening;
    a second gas chamber in communication with said annular region at the outer edge of said rotating disc; and
    filter means intermediate said first and second gas chamber for allowing gas flow between said gas chambers through said filter.

2. A gas circulation and filtration apparatus as in claim 1 wherein said substantially small distance is in the range of 0.020-inch to 0.060-inch.

3. A gas circulation and filtration apparatus as in claim 1 which additionally includes base means including means for receiving said disc and for rotation of said disc and a cover means adapted to be disposed upon said base means for enclosing said magnetic disc recording system, said cover means additionally formed to include said control surface.

4. A gas circulation and filtration apparatus as in claim 3 wherein said cover means is additionally formed to include said first gas chamber.

5. A gas circulation and filtration apparatus as in claim 3 wherein said cover means is additionally formed to include said filter means.

6. A gas circulation and filtration apparatus for use with a magnetic disc recording system, said system including a base plate and a rotating disc having a first side and an outer edge, comprising:
    cover means adapted to abut said base plate, said cover means comprising a stationary control surface adapted to be parallel to said first side and spaced therefrom a distance in the range of 0.020 to 0.060 inch, said control surface having an opening formed therein adapted to be concentric with the center of said rotating disc;
    a first gas chamber in communication with said opening; and
    filter means in communication with said first gas chamber for allowing gas flow into said first gas chamber.

7. An apparatus as in claim 6 wherein said cover means includes said first gas chamber.

8. An apparatus as in claim 6 wherein said cover means includes said filter means.

9. A gas circulation and filtration apparatus for use with a magnetic disc system wherein the magnetic disc has at least one side, comprising
    a first chamber,
    means within said first chamber adapted to receive the magnetic disc for rotation thereof,
    a stationary control surface within said first chamber and disposed parallel to the disc during rotation thereof and spaced therefrom at a distance which causes gas flow therebetween to be substantially laminar,
    means for supplying gas between said control surface and the disc, said means being the only means for supplying gas to said first chamber, and
    filter means including a filter communication with said gas supplying means such that gas supplied to said first chamber is required to first pass through said filter.

10. The gas circulation system of claim 9 wherein said gas supplying means comprises an orifice in said control surface.

11. The gas circulation system of claim 9 or 10 further including
    a second chamber, said second chamber receiving gas exhausted from said first chamber and enclosing said filter means, thereby causing gas to be recirculated through said filter means.

12. A gas circulation and filtration system for use with a magnetic disc recording system comprising a base including means to receive a magnetic disc for rotation thereof, a cover adapted to be affixed to said base during rotation of the disc, said base and said cover forming a chamber, a stationary control surface within said chamber and disposed parallel to the disc during rotation thereof, the distance between said stationary control surface and the disc being in the range of 0.020–0.060 inches, means operatively connected to said control surface for supplying gas between said control surface and the disc, and filter means including a filter in communication with said gas supplying means such that gas supplied to said chamber is required to pass through said filter, said gas supplying means and said filter means being associated with said stationary control surface such that said gas supplying means and said filter means are removed from said chamber when said stationary control surface is removed from said chamber.

13. The invention of either claim 9 wherein the distance between said stationary control surface and the disc is in the range of 0.020–0.060 inches.

14. A method of filtering and recirculating gas for use in a magnetic disc system comprising enclosing a magnetic disc within a chamber, disposing a stationary control plate within the chamber closely parallel to the disc such that gas supplied to the space between the disc and the control plate is pumped therebetween in a laminar flow due to the rotation of the disc, passing gas exhausted from the chamber through a filter, and resupplying the filtered gas to the space between the disc and the control plate.

15. The method of claim 14 wherein the disposing step includes the additional step of disposing the stationary control plate parallel to the disc at a distance in the range of 0.020–0.060 inches.

* * * * *